| United States Patent [19] | [11] | 4,201,839 |
|---|---|---|
| Johnson et al. | [45] | May 6, 1980 |

[54] CELL CONTAINING AN ALKALI METAL ANODE, A SOLID CATHODE, AND A CLOSOBORANE AND/OR CLOSOCARBORANE ELECTROLYTE

[75] Inventors: Jack W. Johnson; M. Stanley Whittingham, both of Fanwood, N.J.

[73] Assignee: Exxon Research and Engineering Co., Florham Park, N.J.

[21] Appl. No.: 956,746

[22] Filed: Nov. 1, 1978

[51] Int. Cl.$^2$ .................... H01M 6/14; H01M 10/36
[52] U.S. Cl. .................... 429/194; 429/197; 429/198; 429/199; 429/200
[58] Field of Search ............... 429/194, 198, 199, 191, 429/188, 218, 192, 196, 200; 252/62.2

[56] References Cited

U.S. PATENT DOCUMENTS

| 3,877,988 | 4/1975 | Dey et al. ................ 429/194 |
|---|---|---|
| 3,988,164 | 10/1976 | Liang et al. ................ 429/121 |
| 4,020,240 | 4/1977 | Schlaikjer ................ 429/199 X |
| 4,060,674 | 11/1977 | Klemann et al. ................ 429/194 |
| 4,071,664 | 1/1978 | Dey ................ 429/199 X |
| 4,104,451 | 8/1978 | Klemann et al. ................ 429/194 |
| 4,139,680 | 2/1979 | Schlaikjer ................ 429/50 |
| 4,139,681 | 2/1979 | Klemann et al. ................ 429/191 |

*Primary Examiner*—Anthony Skapars
*Attorney, Agent, or Firm*—Kenneth P. Glynn

[57] ABSTRACT

A novel electrochemical cell is disclosed which contains an alkali metal anode, a solid cathode, and an electrolyte containing one or more closoborane and/or closocarborane compounds in aprotic solvent. Preferred cells are those containing lithium anodes, chalcogenide cathodes and electrolytes containing one or more closoborane compounds in aprotic solvent with a chelating agent.

44 Claims, No Drawings

CELL CONTAINING AN ALKALI METAL ANODE, A SOLID CATHODE, AND A CLOSOBORANE AND/OR CLOSOCARBORANE ELECTROLYTE

BACKGROUND OF THE INVENTION

1. Field of the Invention

This invention relates to a novel electric current producing cell. More particularly, this invention relates to improvements in electric current producing cells having alkali metal-containing anodes, solid cathodes, and electrolytes, wherein the electrolytes contain closoborane and/or closocarborane compounds in aprotic solvent with chelating agent.

2. Description of the Prior Art

There has been considerable interest in recent years in developing high energy density batteries or voltaic cells. Among the systems being investigated are those employing nonaqueous liquid, fused or solid electrolytes, with light weight metals, such as alkali metals, as anodes, and with cathodes containing metal chalcogenide compounds. Such systems are described, for example, in U.S. Pat. Nos. 3,988,164; 3,925,098; 3,864,167 and 3,791,867.

Various efforts have been made to develop new electrolytes for these and similar secondary cell systems. For example, U.S. Pat. No. 4,060,674 (Klemann et al) described alkali metal anode/solid cathode cells having electrolytes of organometallic alkali metal salts and organic solvents. Also, the use of clovoboranes as additives to electrolytes in certain cells has been taught in U.S. Pat. Nos. 4,020,240 (Schlaikjer) and 4,071,664 (Dey). However, these patents teach the use of clovoboranes as electrolyte additives in cell systems containing a liquid cathode-electrolyte salt composition. No suggestion is made that clovoboranes may be used with aprotic organic solvents or that they may be used in cells having solid cathodes.

SUMMARY OF THE INVENTION

The present invention is directed to a novel electrochemical cell which contains an alkali metal anode, a solid cathode, and an electrolyte containing one or more closoborane and/or closocarborane compounds in aprotic organic solvent with a chelating agent.

DETAILED DESCRIPTION OF THE INVENTION

The present invention is directed to electrochemical cells having alkali metal anodes, solid cathodes, and electrolytes containing one or more compounds selected from the group consisting of:

(i) closoborane compounds of the formula:

$$Z_2B_nX_n \quad (1)$$

wherein Z is an alkali metal, B is boron, X is one or more substituents selected from the group consisting of hydrogen and the halogens and n is an integer from 6 to 12; and (ii) closocarborane compounds of the formula:

$$ZCRB_mX_m \quad (2)$$

wherein Z is an alkali metal, C is carbon, R is a radical selected from the group consisting of organic radicals, hydrogen and the halogens, B is boron, X is one or more substituents selected from the group consisting of hydrogen and the halogens, and m is an integer from 5 to 11. These closoborane and closocarborane compounds are employed in aprotic organic solvent with a chelating agent.

The anode employed in the cell of the present invention is, as mentioned, one which contains an alkali metal as its anode-active material. Desirably, this anode-active material is sodium, potassium, lithium, or alloys containing these. It should be noted, therefore, that when the specific alkali metals are recited herein with respect to the anode, such recitations are meant to include alloys of such alkali metals. The anode-active material used in the anode of the present invention is preferably sodium or lithium, and is most preferably lithium. These anode-active materials may, for example, be in contact with other metal structures, e.g., nickel, copper or silver screen, which serve as current collectors and are well known in the art.

The cathode used in the cell of the present invention may be any cathode which produces electric current when coupled with an alkali metal anode and which will function using the specific solid electrolyte described herein. A useful cathode for the cell of the present invention is one which contains as its cathode-active material one or more chalcogenide compounds selected from the group consisting of the sulfides, the selenides, and the tellurides of titanium, zirconium, hafnium, niobium, tantalum, molybdenum and vanadium. In general, such chalcogenides contain about 1.8 to about 3.2 atoms of the chalcogen per metal atom. Advantageously, these chalcogenides are the sulfides, the selenides, and the tellurides of one or more metals selected from the mentioned group and desirably one or more metals selected from titanium, molybdenum and vanadium. Preferred are the titanium chalcogenides. Among the chalcogens employed in the chalcogenides used as the cathode-active materials are, as mentioned, sulfur, selenium, and tellurium. Of these, sulfur and selenium are desired, and sulfur is preferred. Also, among the chalcogenides, those which contain about 1.8 to about 2.1 atoms of chalcogen per metal atom, commonly referred to as dichalcogenides, are preferred.

Examples of cathode-active materials which may be useful, and which are selected from the above-mentioned chalcogenides are titanium disulfide, zirconium disulfide, hafnium disulfide, niobium triselenide, tantalum disulfide, molybdenum trisulfide, vanadium disulfide, vanadium diselenide, and vanadium ditelluride. Also included are the chalcogenides having more than one of the mentioned metals, e.g., $V_{0.25}Ti_{0.75}S_{2.0}$.

The cathode-active material used in the cathode of the cells of the present invention, as mentioned, is preferably a chalcogenide selected from those described above. However, any functional cathode-active material may be used which will function with the alkali metal anode and the electrolyte described herein. For example, such chalcogenide cathode-active materials as iron sulfide, FeOCl, $MoO_3$, $V_2O_5$, VOCl, $VS_4$, $FePS_3$ or even the non-chalcogenide cathode materials such as $CF_x$, e.g., $CF_{0.5}$, which are known in the art, may be used.

The cathode structure itself need not necessarily consist of the cathode-active material alone, but may be a structure such as carbon, nickel, zinc, etc., upon which the cathode-active material is deposited. In one preferred embodiment, however, the cathode structure consists entirely of the cathode-active material. Thus, the cathode-active material is typically a good electronic conductor and may often serve as its own current collector. Also, the cathode-active material may be admixed or diluted with a minor amount of any other electrochemically active material, and alloys (i.e., solid solutions) of the individual cathode-active materials may be used. The cathode may be readily fabricated from the individual or alloyed cathode-active materials using materials and methods well known in the prior art. For example, when the chalcogenides are used, polytetrafluoroethylene bonding agents or support structures such as nickel or copper mesh may be included.

The electrolyte of the cell of the present invention is one which contains one or more closoborane and/or closocarborane compounds in aprotic organic solvent.

The closoboranes are those of Formula (1) above with the specified variables. The variable Z is any alkali metal. Desirably, Z is sodium, potassium or lithium, with lithium and sodium being advantageous and with lithium being preferred. The variable X is, as mentioned, selected from the group consisting of hydrogen and the halogens, e.g., F, Cl, Br and I. Of these, H, F and Cl are desired, with H and Cl preferred. The variable n is an integer from 6 to 12, desirably 8 to 12, and preferably 10 to 12.

The closocarboranes are those of Formula (2) above with the specified variables. The comments made with respect to Formula (1) variables Z and X are applicable here. The variable m is an integer from 5 to 11 and is desirably 7 to 11 and preferably 9 to 11. The variable R is selected from the group consisting of organic radicals and X, i.e., hydrogen and the halogens. Of hydrogen and the halogens, the comments above concerning X in Formula (1) are applicable. Concerning the organic radicals represented by R, these include organic radicals selected from the group consisting of inertly substituted and unsubstituted alkyls, aryls, alkaryls and aralkyls. By "inertly substituted" is meant radicals containing substituents which have no detrimental effect on the electrolyte compositions in the context of their effectiveness in electrochemical cells. Such inert substituents include halogens, cyanoradical, etc. In general, the alkyl radicals have 1 to 8 carbon atoms, the aryls have 6 to 18 carbon atoms and the aralkyl and alkaryl radicals have 7 to 50 carbon atoms. Desirably, the organic radicals are those selected from alkyls having 2 to 6 carbon atoms, aryls having 6 to 12 carbon atoms and alkaryls and aralkyls having 7 to 25 carbon atoms. Preferably, the organic radicals are those selected from alkyls having 2 to 4 carbon atoms and the phenyl radical.

Among the closoborane and closocarborane compounds used in the electrolyte of the cell of the present invention are:

$Li_2B_{10}Cl_{10}$ (3)

$Li_2B_{12}Cl_{12}$ (4)

$Li_2B_8Br_8$ (5)

$Li_2B_{10}Cl_8H_2$ (6)

$Li_2B_8H_8$ (7)

$Li_2B_{11}I_{10}H$ (8)

$LiC(CH_3)B_{11}Cl_{11}$ (9)

$LiC(C_2H_5)B_7Cl_7$ (10)

$LiC(C_2H_4Cl)B_8Cl_8$ (11)

$LiC(C_6H_5)B_{10}Br_{10}$ (12)

and the like.

Other embodiments of the closoboranes and closocarboranes should now become apparent in view of the foregoing. Of course, the analogs and homologs as well as the corresponding other alkali metal based compounds are included, e.g., $Na_2B_{10}Cl_{10}$ and $NaC(C_3H_7)B_8I_8$.

The closoborances and closocarboranes used in the present invention electrolyte systems are employed in aprotic solvent. In addition, it is necessary to include an amount of a chelating agent, e.g., a chelating ether.

The aprotic solvent used in the electrolyte of the present invention is any aprotic organic solvent which enables ions to migrate between anode and cathode in the presence of the above-mentioned closoborane and/or closocarborane compounds, when used in conjunction with a chelating agent. Among the aprotic organic solvents which may be employed are dioxolane, tetrahydrofuran, propylene carbonate, methyl sulfoxide, mixtures thereof and the like. The ethers, e.g., dioxolane, are preferred.

The chelating agent is one which enhances the solubility of the closoborane and/or closocarborane in the aprotic organic solvent. Among these chelating agents are dimethoxyethane, diglyme, triglyme, tetraglyme, TMED, PMDT, other chelating tertiary amines, mixtures thereof, and the like. Of these, the ethers, e.g., dimethoxyethane, are preferred.

In general, about 2 to about 50 grams of closoborane and/or closocarborane compound are used per 100 grams of aprotic organic solvent (excluding chelating agent). Desirably, about 5 to about 30 grams of compound per 100 grams of aprotic organic solvent, preferably about 12 to about 18 grams per 100 grams of aprotic organic solvent, are used. As to the chelating agent, in general about 2 to about 50 grams of chelating agent are used per 100 grams of aprotic organic solvent. Desirably, about 5 to about 30, and preferably about 12 to about 18 grams of chelating agent per 100 grams of aprotic organic solvent are employed.

It has thus been discovered that cells having alkali metal anodes, solid cathodes and electrolytes as described are obtained which have high cell capacities and advantageous utility.

The present invention is more fully understood by the following examples, presented for illustrative purposes only.

EXAMPLE 1

A cell was prepared with lithium anode material, titanium disulfide cathode material and a DME chelated closoborane in dioxolane. The anode was lithium sheet and the cathode was made of 90 weight percent $TiS_2$ and 10 weight percent Teflon which was hot pressed at 300° C. onto an expanded stainless steel metal grid. The electrolyte was 39 weight percent $Li_2B_{10}Bl_{10}.5DME$, remainder dioxolane.

The cell was constructed by surrounding the cathode with polypropylene separators and a sheet of lithium and the above as electrolyte. The steady voltage of this cell was 2.68 volts which on discharge at 2 ma fell to 2.40 volts. The discharge rate was increased to 4 ma after 1 hour, and the total utilization of the cell was greater than 85% based on the reaction Li+TiS$_2$→LiTiS$_2$. On decreasing the rate to 2 ma, 92% of the theoretical capacity was obtained. The cell was then charged at 2 ma, followed by a discharge at 2 ma; more than 90% of the first discharge capacity was obtained on this second discharge. This charge/discharge cycling was then repeated more than 20 times, thus indicating the intrinsic reversibility of the electrolyte.

EXAMPLE 2

A cell having a lithium sheet anode, a 0.079 molar Li$_2$B$_{10}$Cl$_{10}$ in a 30% DME, 70% by weight dioxane electrolyte and a cathode having a 90 weight percent TiS$_2$, 10 weight percent Teflon hot pressed at 300° C. into an expanded metal grid, was constructed as in Example 1. This cell had a very low capacity on initial discharge (~2% theoretical capacity), but on cycling the cell the capacity increased significantly; thus, on the 10th cycle the capacity was over 74% of the theoretical expected for the reaction Li+TiS$_2$→LiTiS$_2$. This again shows the intrinsic reversibility of this electrolyte. It is believed that the observed behavior is probably associated with an initial electrolyte of very low concentration. This concentration increased on cycling as the electrolyte solvent volatilized, rendering the increased capacity.

EXAMPLE 3

A cell was made up as in above examples except that, as electrolyte, Li$_2$B$_{12}$Cl$_{12}$ was dissolved to saturation (0.15 molar) in acetonitrile. The cell emf was just below 2.5 volts on discharge at 4 ma, but considerable gassing of the cell occurred at the lithium anode. Little rechargeability was observed and no capacity on the second discharge. The cell was warm to the touch at this point and clearly there was spontaneous reaction between the electrolyte solvent and the lithium. This was confirmed in a blank reaction. This example shows that even though the salt may be dissolved in highly polar solvents such as water and acetonitrile, such systems are not compatible with alkali such as lithium metal anodes.

What is claimed is:

1. An electrochemical cell, comprising:
   (a) an alkali metal-containing anode;
   (b) a solid cathode; and,
   (c) an electrolyte containing one or more compounds selected from the group consisting of:
      (i) closoborane compounds of the formula:

wherein Z is an alkali metal, B is boron, X is one or more substituents selected from the group consisting of hydrogen and the halogens, and n is an integer from 6 to 12; and,
      (ii) closocarborane compounds of the formula:

wherein Z, B and X are as defined above, C is carbon, and R is selected from the group consisting of inertly substituted and unsubstituted alkyls, aryls, alkaryls and aralkyls, hydrogen, and the halogens, said compounds being dissolved in aprotic organic solvent in the presence of a chelating agent sufficient to enable the migration of ions between said anode and said cathode.

2. The cell of claim 1 wherein said electrolyte contains one or more closoborane compounds.

3. The cell of claim 2 wherein said variable X is selected from the group consisting of H, F and Cl.

4. The cell of claim 2 wherein said variable n is an integer from 8 to 12.

5. The cell of claim 2 wherein said variable X is selected from the group consisting of H and Cl, and said variable n is an integer from 10 to 12.

6. The cell of claim 2 wherein about 2 to about 50 grams of compound are used per 100 grams of aprotic organic solvent.

7. The cell of claim 1 wherein said electrolyte contains one or more closocarborane compounds.

8. The cell of claim 7 wherein the variable R is selected from the group consisting of inertly substituted and unsubstituted organic radicals selected from alkyls having 1 to 8 carbon atoms, aryls having 6 to 18 carbon atoms and alkaryls and aralkyls having 7 to 50 carbon atoms, hydrogen and the halogens.

9. The cell of claim 8 wherein R is selected from the group consisting of hydrogen and the halogens.

10. The cell of claim 9 wherein R is selected from the group consisting of H, F and Cl.

11. The cell of claim 8 wherein R is selected from the group consisting of inertly substituted and unsubstituted organic radicals selected from alkyls having 2 to 6 carbon atoms, aryls having 6 to 12 carbon atoms and alkaryls and aralkyls having 7 to 25 carbon atoms.

12. The cell of claim 11 wherein R is selected from the group consisting of inertly substituted and unsubstituted organic radicals selected from the group consisting of alkyls having 2 to 4 carbon atoms and phenyl.

13. The cell of claim 7 wherein about 2 to about 50 grams of compound are used per 100 grams of aprotic organic solvent.

14. The cell of claim 1 wherein said alkali metal-containing anode contains an alkali metal selected from the group consisting of lithium, sodium and potassium.

15. The cell of claim 14 wherein said solid cathode is a chalcogenide.

16. The cell of claim 15 wherein said electrolyte contains one or more closoborane compounds.

17. The cell of claim 16 wherein said variable X is selected from the group consisting of H, F and Cl.

18. The cell of claim 16 wherein said variable n is an integer from 8 to 12.

19. The cell of claim 16 wherein said variable X is selected from the group consisting of H and Cl, and said variable n is an integer from 10 to 12.

20. The cell of claim 16 wherein about 5 to about 30 grams of compound are used per 100 grams of aprotic organic solvent.

21. The cell of claim 15 wherein said electrolyte contains one or more closocarborane compounds.

22. The cell of claim 21 wherein the variable R is selected from the group consisting of inertly substituted and unsubstituted organic radicals selected from alkyls having 1 to 8 carbon atoms, aryls having 6 to 18 carbon atoms and alkaryls and aralkyls having 7 to 50 carbon atoms, hydrogen and the halogens.

23. The cell of claim 22 wherein R is selected from the group consisting of hydrogen and the halogens.

24. The cell of claim 23 wherein R is selected from the group consisting of H, F and Cl.

25. The cell of claim 24 wherein R is selected from the group consisting of inertly substituted and unsubstituted organic radicals selected from alkyls having 2 to 6 carbon atoms, aryls having 6 to 12 carbon atoms and alkaryls and aralkyls having 7 to 25 carbon atoms.

26. The cell of claim 25 wherein R is selected from the group consisting of inertly substituted and unsubstituted organic radicals selected from the group consisting of alkyls having 2 to 4 carbon atoms and phenyl.

27. The cell of claim 21 wherein about 5 to about 30 grams of compound are used per 100 grams of aprotic organic solvent.

28. The cell of claim 15 wherein said alkali meta-containing anode contains lithium.

29. The cell of claim 28 wherein said electrolyte contains one or more closoborane compounds.

30. The cell of claim 29 wherein said variable X is selected from the group consisting of H, F and Cl.

31. The cell of claim 29 wherein said variable n is an integer from 8 to 12.

32. The cell of claim 29 wherein said variable X is selected from the group consisting of H and Cl, and said variable n is an integer from 10 to 12.

33. The cell of claim 29 wherein about 5 to about 30 grams of compound are used per 100 grams of aprotic organic solvent.

34. The cell of claim 28 wherein said electrolyte contains one or more closocarborane compounds.

35. The cell of claim 34 wherein the variable R is selected from the group consisting of inertly substituted and unsubstituted organic radicals selected from alkyls having 1 to 8 carbon atoms, aryls having 6 to 18 carbon atoms and alkaryls and aralkyls having 7 to 50 carbon atoms, hydrogen and the halogens.

36. The cell of claim 35 wherein R is selected from the group consisting of hydrogen and the halogens.

37. The cell of claim 36 wherein R is selected from the group consisting of H, F and Cl.

38. The cell of claim 37 wherein R is selected from the group consisting of inertly substituted and unsubstituted organic radicals selected from alkyls having 2 to 6 carbon atoms, aryls having 6 to 12 carbon atoms and alkaryls and aralkyls having 7 to 25 carbon atoms.

39. The cell of claim 38 wherein R is selected from the group consisting of inertly substituted and unsubstituted organic radicals selected from the group consisting of alkyls having 2 to 4 carbon atoms and phenyl.

40. The cell of claim 34 wherein about 5 to about 30 grams of compound are used per 100 grams of aprotic organic solvent.

41. The cell of claim 1 wherein said aprotic organic solvent is an ether.

42. The cell of claim 41 wherein said chelating agent is a chelating ether.

43. The cell of claim 42 wherein said aprotic organic solvet is dioxolane, wherein said chelating agent is dimethoxyethane, said anode contains lithium and wherein said cathode contains chalcogenide cathode-active material.

44. The cell of claim 43 wherein said chalcogenide is selected from the group consisting of sulfides of titanium, molybdenum and vanadium.

* * * * *